(12) United States Patent
Song et al.

(10) Patent No.: US 10,997,174 B2
(45) Date of Patent: May 4, 2021

(54) CASE JOIN DECOMPOSITIONS

(71) Applicant: SAP SE, Walldorf (DE)

(72) Inventors: Sang Il Song, Seoul (KR); Junhee Woo, Seoul (KR); Taehyung Lee, Seoul (KR); Sung Heun Wi, Gyeonggi-do (KR); Ki Hong Kim, Seoul (KR); Yongsik Yoon, Walldorf (DE)

(73) Assignee: SAP SE, Walldorf (DE)

( * ) Notice: Subject to any disclaimer, the term of this patent is extended or adjusted under 35 U.S.C. 154(b) by 348 days.

(21) Appl. No.: 14/947,927

(22) Filed: Nov. 20, 2015

(65) Prior Publication Data

US 2017/0147645 A1 May 25, 2017

(51) Int. Cl.
*G06F 16/24* (2019.01)
*G06F 16/2453* (2019.01)

(52) U.S. Cl.
CPC .............. *G06F 16/24544* (2019.01)

(58) Field of Classification Search
CPC ........ G06F 17/30958; G06F 17/30442; G06F 17/30466; G06F 17/30554; G06F 17/30451; G06F 17/30448; G06F 17/30935; G06F 17/30327; G06F 16/248; G06F 16/24542; G06F 16/338; G06F 16/2453; G06F 16/24544; G06F 16/24
See application file for complete search history.

(56) References Cited

U.S. PATENT DOCUMENTS

| | | | | |
|---|---|---|---|---|
| 7,644,366 B1* | 1/2010 | McKinney | ............ | G06F 16/283 715/738 |
| 8,521,723 B1* | 8/2013 | Ahmed | ............. | G06F 16/24534 707/714 |
| 2004/0220911 A1* | 11/2004 | Zuzarte | ............. | G06F 16/90335 |
| 2007/0219951 A1* | 9/2007 | Ahmed | ............. | G06F 17/30466 |
| 2008/0195643 A1* | 8/2008 | Sheth-Voss | ......... | G06F 17/3056 |
| 2011/0035744 A1* | 2/2011 | Bhatia | .................... | G06F 3/0484 717/174 |
| 2011/0082854 A1* | 4/2011 | Eidson | .............. | G06F 17/30463 707/714 |
| 2011/0099500 A1* | 4/2011 | Smith | .................... | G06F 3/0482 715/771 |
| 2012/0030225 A1* | 2/2012 | Muller | ..................... | G06F 16/21 707/760 |
| 2012/0310916 A1* | 12/2012 | Abadi | ................ | G06F 17/30445 707/713 |
| 2012/0323885 A1* | 12/2012 | Wang | ................ | G06F 17/30498 707/714 |

(Continued)

*Primary Examiner* — Etienne P Leroux
*Assistant Examiner* — Cindy Nguyen
(74) *Attorney, Agent, or Firm* — Mintz Levin Cohn Ferris Glovsky and Popeo, P.C.

(57) ABSTRACT

Methods and apparatus, including computer program products, are provided for a case join. In one aspect, there is provided method, which may include receiving a query for a predefined view that is configured to inhibit modification; detecting whether the predefined view includes a database table extended to include an additional column; and generating, in response to the query, a view based on a case join, when the predefined view includes the database table extended to include the additional column. Related apparatus, systems, methods, and articles are also described.

19 Claims, 7 Drawing Sheets

(56) References Cited

U.S. PATENT DOCUMENTS

| | | | | |
|---|---|---|---|---|
| 2013/0117313 A1* | 5/2013 | Miao | ................... | G06F 21/6227 |
| | | | | 707/781 |
| 2016/0103914 A1* | 4/2016 | Im | ........................... | H04L 63/20 |
| | | | | 707/770 |
| 2016/0232207 A1* | 8/2016 | Brunel | ................... | G06F 16/282 |
| 2016/0371355 A1* | 12/2016 | Massari | .................. | G06F 16/25 |

\* cited by examiner

CASE JOIN DECOMPOSITIONS

FIELD

The present disclosure generally relates to data processing and, in particular, databases.

BACKGROUND

Database queries have become increasingly complex. As a consequence, some queries (and/or other database operations) or views may be provided to an end-user in a pre-configured form that is not readily modifiable by an end-user. Although this provides convenience to the end-user, it may reduce flexibility. An example of this is a predetermined view, such as a sales revenue view, in a current quarter for product X. The predetermined view represents a common query on a database that can be preconfigured by the database system developer, for example, and not readily modifiable by the end-user. This predetermined view may provide a certain view that can be presented at a user interface but not modifiable by the end-user.

SUMMARY

Methods and apparatus, including computer program products, are provided for a case join.

In one aspect, there is provided method, which may include receiving a query for a predefined view that is configured to inhibit modification; detecting whether the predefined view includes a database table extended to include an additional column; and generating, in response to the query, a view based on a case join, when the predefined view includes the database table extended to include the additional column. Related apparatus, systems, methods, and articles are also described.

In some implementations, the above-noted aspects may further include additional features described herein including one or more of the following. The predefined view may represent a subquery on a predefined set of data tables at a database. The query may be received at a query optimizer. The inhibition may prevent adding the additional column directly to the database table. The query optimizer may perform a case join to provide the predefined view including the additional column. The case join may include a branch condition as a condition predicate for performing a right outer join or a left inner join. The query optimizer may decompose the case join, when the case join comprises a self key join in which tables are being joined with themselves. The query optimizer may decompose the case join by at least adding at the view the added column, without performing a join.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1A:
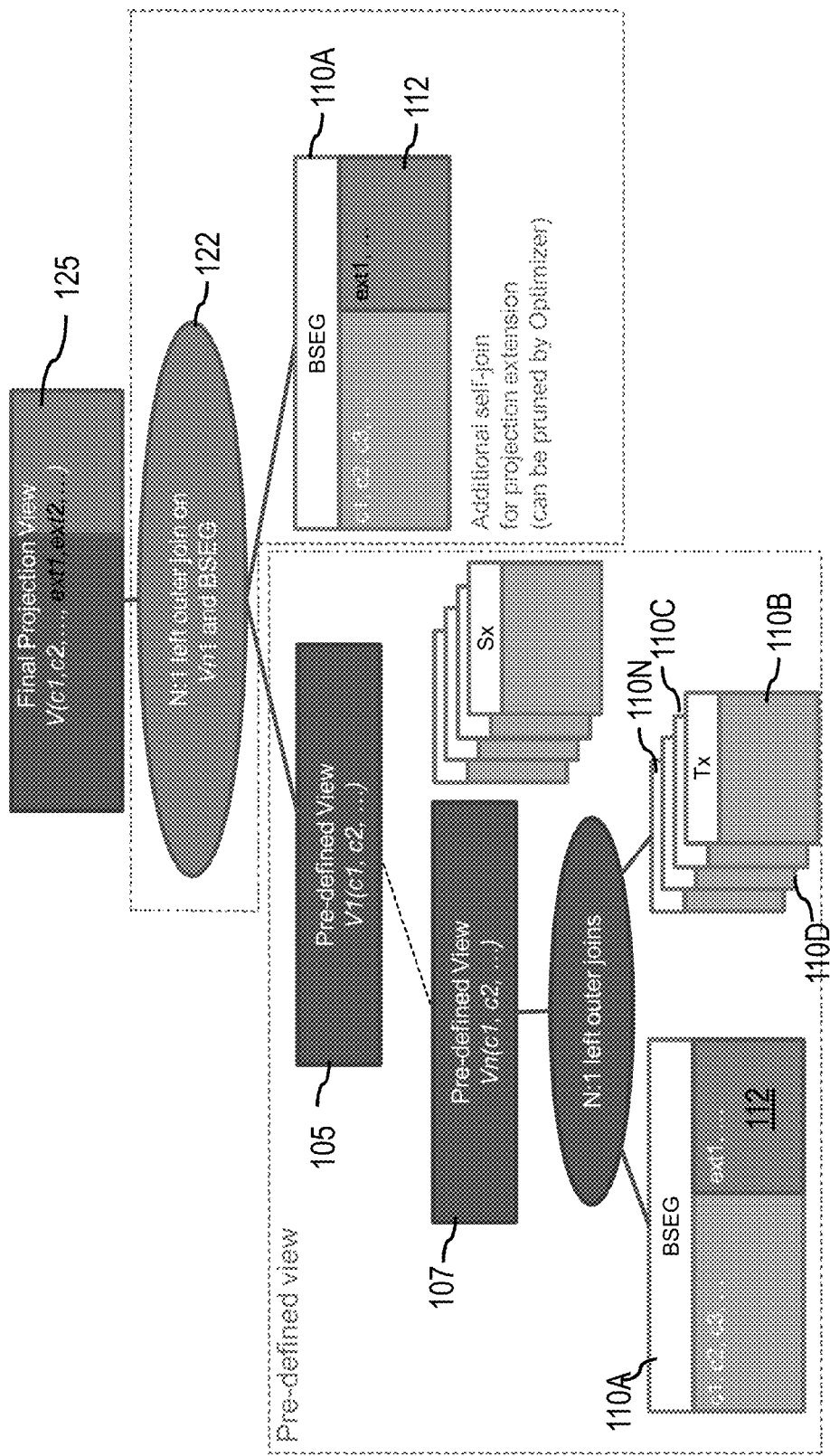
FIG. 1A depicts an example of a predetermined view 105.

Like labels are used to refer to same or similar items in the drawings.

DETAILED DESCRIPTION

Databases often receive a query or other operation that is relatively complex. To that end, these operations may be optimized to minimize usage of memory, processing resources, power, time to execute the query at the database, and/or the like. For example, an application may present a user interface view of data obtained from one or more database tables. This user interface view may include data obtained from a predefined view provided by a query on the database system, so the predefined view may not be configurable or changeable by the end-user of the database. As a consequence, if the end-user makes changes to the underlying database table(s) (which is modifiable by the end-user), the predefined view (which is not modifiable by the end-user) may not include the underlying change to the database table(s).

FIG. 1A depicts an example of a predefined view 105 formed from an outer join, such as a left outer join 107, of one or more tables 110A-N. In the example of FIG. 1A, the end-user may want to extend table 110A by adding data 112 (labeled ext 1) to the table 110A. Because the predefined view is "predefined" and, as such, not modifiable by the end-user of the database, the data 112 can be added to the table but the added data will not be reflected in the predefined view 105. To add the data 112 extension to the predefined view 105, additional operations on the view itself are performed. In the example of FIG. 1A, at least one additional left outer join 122 is performed to join predefined view 105 and the database table 110A that includes the data extension 112. This results in final projection view 125 that includes the extended data 112. This example makes clear that a relatively simple operation requires additional joins 107 and 122, which are relatively expensive with respect to time, processing resources, memory resources, power, and/or the like.

Figure 1B:
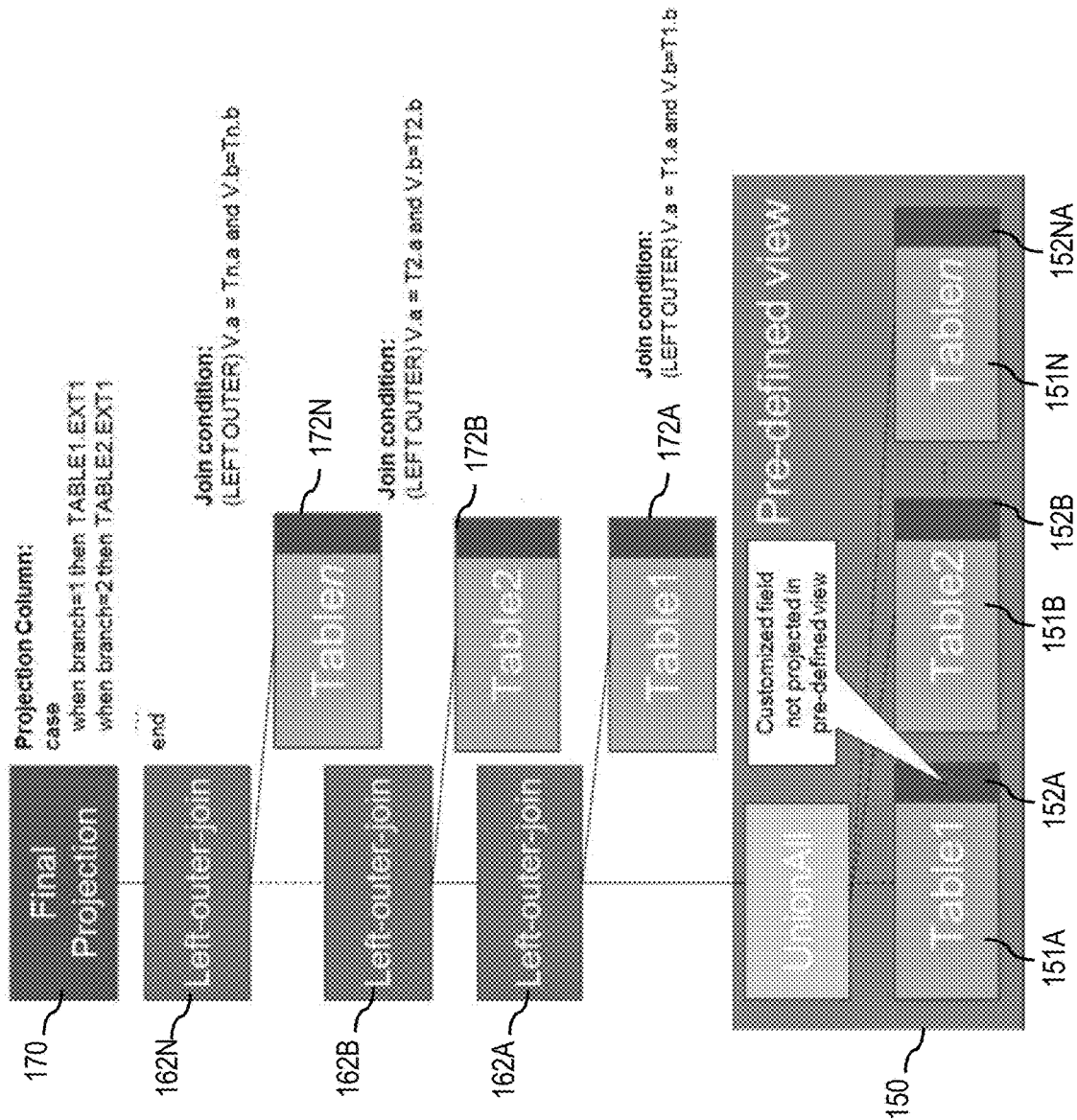
FIG. 1B depicts the outer joins that may need to be performed to add data to a predetermined view.

FIG. 1B shows another example of a predefined view 150 in which data extensions 152A-N are being performed to Tables 1-N 151A-N. Unlike the example of FIG. 1A in which only a single table is being extended, in the example of FIG. 1B, N tables are being extended with data.

To include data extensions 152A-N to the final projection view 170, a quantity of N joins 162A-B are required. For example, table 172A is combined using a left outer join 162A with the UNION of all tables 152A-N. Likewise, table 172B is combined using a left outer join 162B with the result of left outer join 162A, and table 172N is combined using a left outer join 162N with the result of left outer join 162B. The result of left outer join 162N provides the data extensions (which in this example are columns 152A-N) to the view 170. Like the example of FIG. 1A, the FIG. 1B example further illustrates the expense with respect to time, processing resources, memory resources, power, and/or the like.

In some example embodiments, there is provided a case join. Moreover, in some example embodiments, the case join may provide an outer join, such as a left outer join or a right outer join. Moreover, the case join may enable an optimization (which is described further below with respect to FIG. 3).

Figure 2:
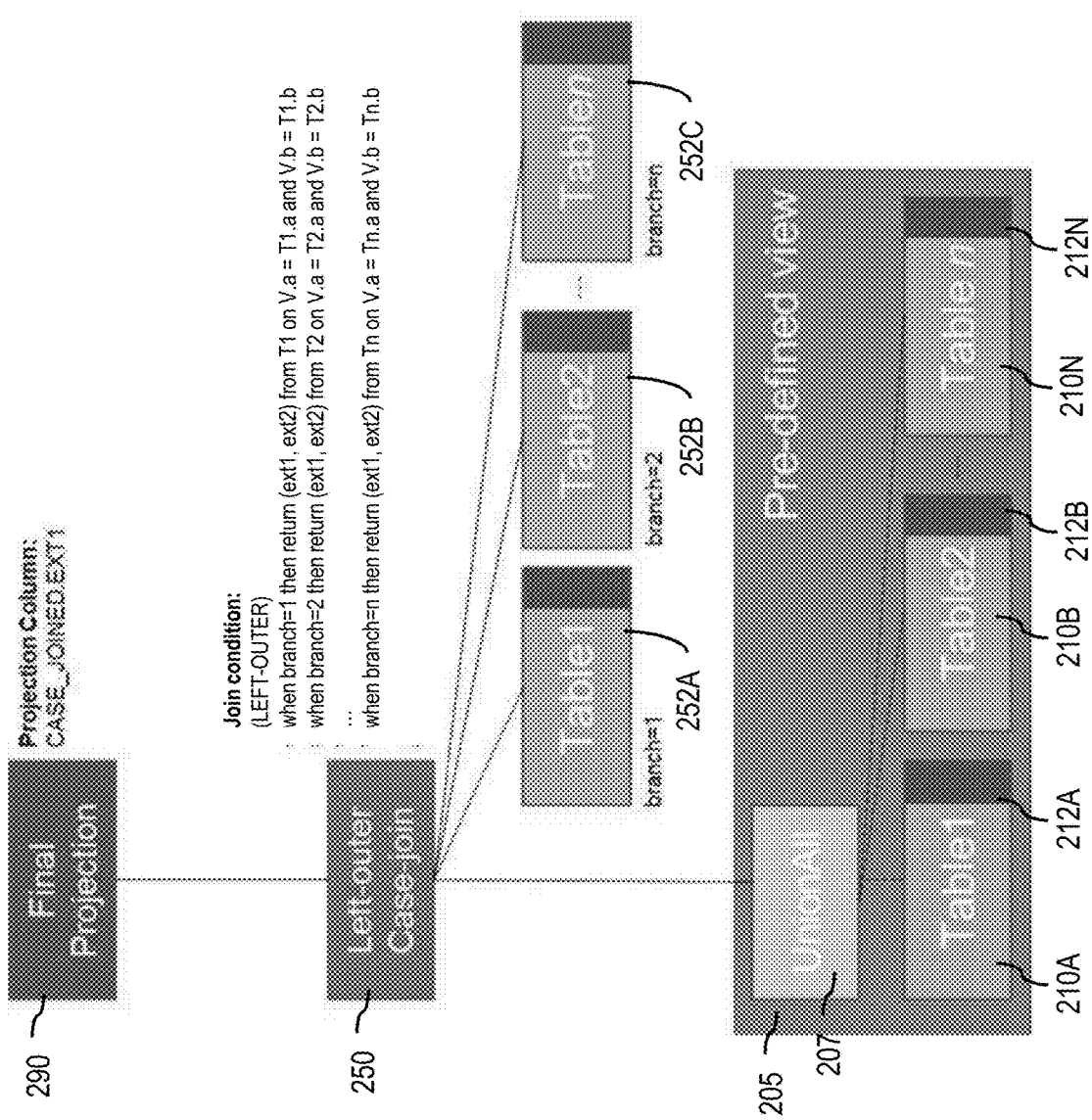
FIG. 2 depicts an example of a case join 250.

FIG. 2 depicts an example of a predefined view 205 that is a UNION 207 of a quantity of N tables, such as tables 210A-N. In the example of FIG. 2, each of the tables 210A-N is being extended 212A-N with data, such as an additional column or other portion of the database such as a row, field, etc. Although the underlying tables 210A-N in the database can be modified with the extensions 212A-N, the predefined view 205 cannot be modified.

In some example embodiments, there is provided a case join 250. In the example of FIG. 2, the case join 250 is a left outer case join, although the case join 250 may be implemented as a right outer join as well as other types of outer joins as well.

In the example of FIG. 2, the case join 250 includes a first condition branch that joins Table 1 252A only with Table 1 210A. The case join 250 includes a second condition branch that joins Table 2 252B only with Table 2 210B. In addition, the case join 250 includes an $N^{th}$ condition branch that joins Table N 252N only with Table N 210N. In this way, there is a reduced number of joins needed to generate the final projection view 290 having the extensions 212A-N, when compared to the example described with respect to FIG. 1B. Moreover, the need to perform multiple UNION operations at 207 may be reduced.

The case join 250 may have a syntax as shown in Table 1 below. As can be seen by Table 1, there are conditions represented by branches, one for each table 210A-N. When the first branch condition is satisfied by Table 1 252A, then the left outer case join 250 outputs a Table 1 equal to the View Table 1 210A including extension 212A. And, when the second branch condition is satisfied by Table 2 252B, then the left outer case join 250 outputs a Table 2 equal to the View Table 2 210B including extension 212B; and so forth through N. The branch field is a pre-defined column in Table 2 210A-N. In a table, all branch fields should have the same value, and it should have different values with respect to other table branch-fields. Exclusive values should be assigned among tables. In short, branch field indicates from which table a row comes from. For example, for each row that meets given <branch-condition>, performs join on <join-table> with given <join-condition>. To illustrate further, if V has <a, b, branch-field>, ('val1', 'val1', 1), ('val2', 'val2', 1), and ('val 3', 'val3', 2). Only the first row rows are joined with table T1 with join condition Va.=T1.a and V1.b=T1.b and then the third row is joined with T2 with its join condition

TABLE 1

Join condition:
(LEFT-OUTER)

when branch=1 then return (ext1, ext2) from T1 on V.a = T1.a and V.b = T1.b
when branch=2 then return (ext1, ext2) from T2 on V.a = T2.a and V.b = T2.b
...
when branch=n then return (ext1, ext2) from Tn on V.a = Tn.a and V.b = Tn.b Table 2 below shows a more general syntax for the case join disclosed herein. Referring to Table 2, for each row in a table identified by <table-ref0>, the first satisfied when-clause will be joined with the table referenced in the then-clause. For example, if a row in <table-ref> (which represents a given table being joined, such as one of tables 210A-N) has a value 1 in column "A" and <conj-pred1> is "A=1" then the condition for the first branch is satisfied, so it is joined with <table_ref1>. The 'then'-clause consists of RETURN <proj-col-list>) FROM <table-ref>. The <proj-col-list> represents projection columns that result from the join.

TABLE 2

Syntax

Figure 3A:
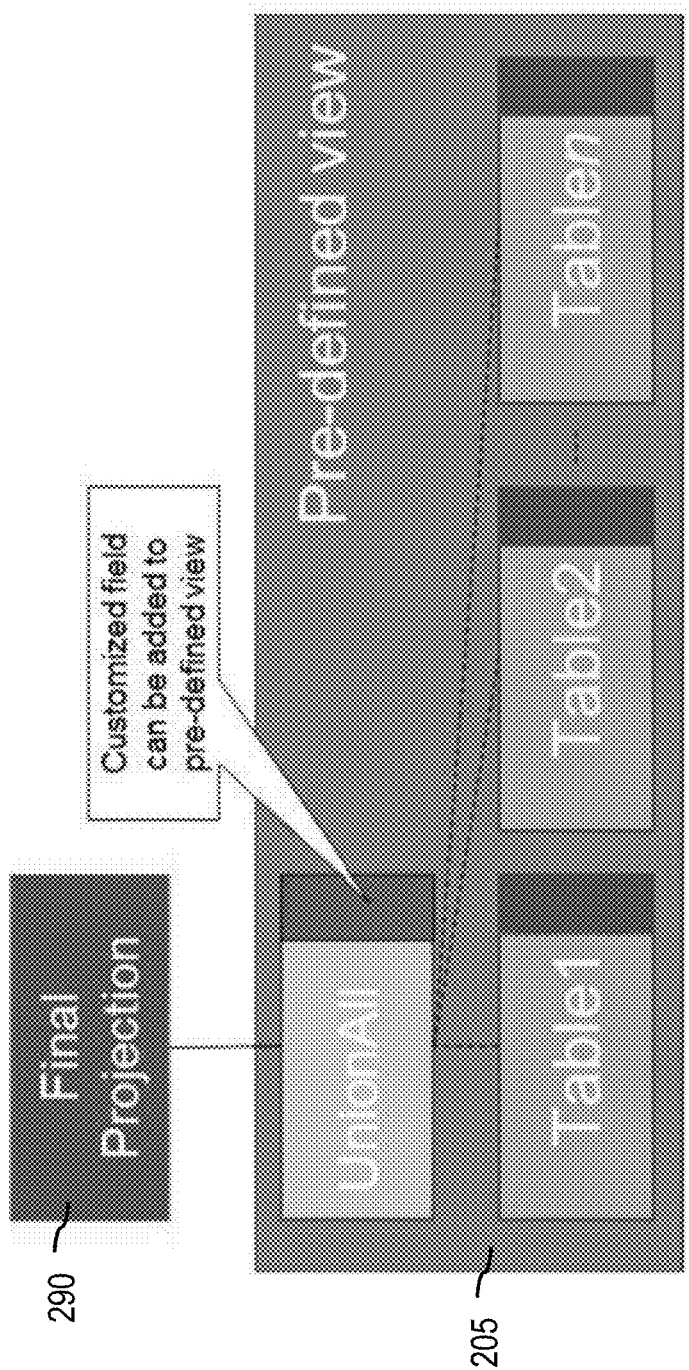
FIG. 3A depicts an example of an optimization that can be performed on the case join.

1  <table-ref0> [join-type] [join-cardinality] CASE JOIN
2    WHEN <cond-pred1> THEN RETURN <proj-col-list1> FROM <table-ref1> ON
3  <join-pred1>
4    WHEN <cond-pred2> THEN RETURN <proj-col-list2> FROM <table-ref2> ON
5  <join-pred2>
6  ...
   [ELSE RETURN <proj-col-list3> FROM <table-ref3> ON <join-pred3>]
   END In some example embodiments, the case join may be decomposed in order to provide a query optimization. Referring to FIG. 2, if Tables 252A-N and Tables 210A-N are the same tables, then FIG. 3A depicts a decomposition that can be performed. FIG. 3A thus represents a decomposition of Tables 252 A-N and Tables 210A-N, when there is a self join or self key join wherein the tables are being joined with themselves. The self key join refers to a join condition that consist of <key_column>=<key_column>, or the conjunction of key columns in multi-column key case. Unlike a self join, the self key join does not produce duplicate records When this is the case, a query optimizer may detect this condition, and trigger the decomposition of the case join at FIG. 2 to FIG. 3A. Referring to FIGS. 2 and 3A, if the same tables exists at Tables 252A-N and Tables 210A-N, the calculation scenario of FIG. 2 may be decomposed by removing the unnecessary case join 250. Specifically, for a given branch condition, a check may be performed to see if the same tables exist. If the same tables exists, a check can be performed to confirm if the table is a self-key join or N:1 left outer join. If so, the unnecessary join such as outer join 250 may be removed.

Although the case join command described above can be used in a variety of computing environments, database systems, query optimizers, and/or the like, the following provides an example system environment in which the case join disclosed herein may be implemented. For example, the case join may represent a node in a calculation scenario of one or more queries or other operations being modeled and/or optimized for a database.

Figure 3B:
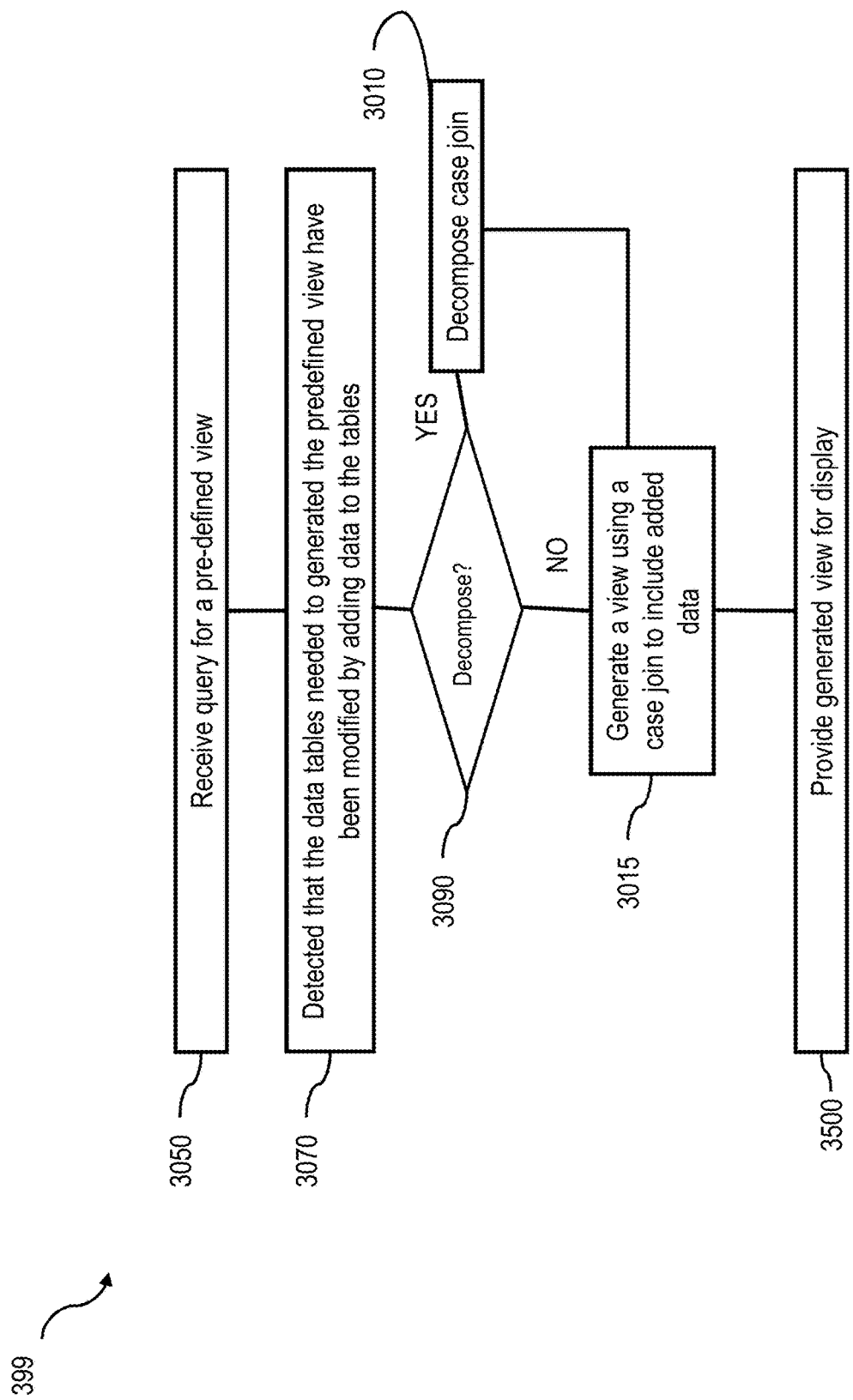
FIG. 3B depicts an example of a process for optimizing a case join.

FIG. 3B depicts an example process for providing a case join, in accordance with some example embodiments.

At 3050, a query may be received for a pre-defined view. The predefined view may represent a query on a predefined set of data tables at a database. For example, a processor, such as a query optimizer, calculation engine, and/or other processor, may receive the query. For example, the received query may correspond to predefined view 205 at FIG. 2.

At 3070, it may be detected that the underlying data tables needed for generation of the predefined view have been modified by adding data to those tables. When that is the case, a case join, such as an outer case join may be used to add the data to the tables. Referring again to FIG. 2, one or more of the tables 210A-N may be modified for example by adding data to a table. Extensions 212A-N depict examples of column extensions to the tables, although the tables may be extended in other ways. In the example of FIG. 2, outer case join 250 may be used to provide a view 290 that includes the extended data.

At 3010, the case join may be decomposed to provide optimization. A processor, such as a query optimizer and/or calculation engine, may detect, at 3090, whether the case join can be decomposed as noted above with respect to FIG. 3A. If so, the processor can decompose the case join at 3010 before generating the view. For example, if the same tables are being joined, then the processor can perform a UNION all operation to add the data extension to the final projection view 290. At 3500, the final view, such as view 290, may be generated using the case join or the case join in its decomposed form. For example, the final view 290 may include the data extended 212A-N at tables 210A-N even though the predefined view 205 does not allow modifying the view. The generated view may be provided, at 3500, to a user interface for presentation.

Figure 4:
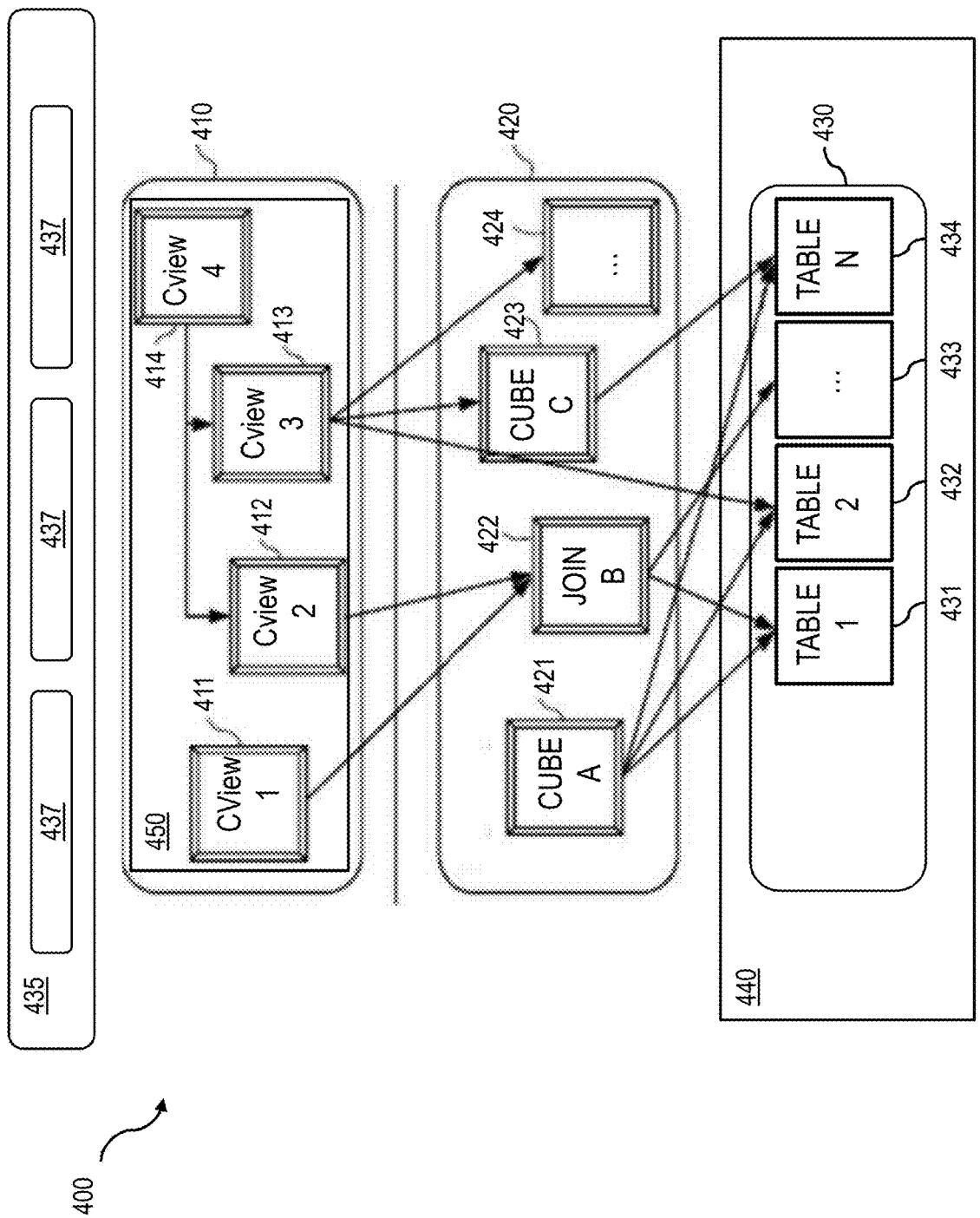
FIG. 4 depicts an example of a database system including a calculation engine.

FIG. 4 is a diagram that illustrates a computing architecture 410 including a database system that includes three layers: a calculation engine layer 410, a logical layer 420, and a physical table-pool 430. One or more application servers 435 implementing database client applications 437 can access the database system 400. Calculation scenarios can be executed by a calculation engine, which can form part of a database or which can be part of the calculation engine layer 410 (which is associated with the database). The calculation engine layer 410 can be based on and/or interact with the other two layers, the logical layer 420 and the physical table pool 430. The basis of the physical table pool 430 consists of physical tables (called indexes) containing the data, which can be stored on one more database servers 440. Various tables 431-434 can be joined using logical metamodels 421-424 defined by the logical layer 420 to form an index. For example, the tables 431-434 in a cube (e.g. an online analytical processing or "OLAP" index) can be assigned roles (e.g., fact or dimension tables) and joined to form a star schema. It is also possible to form join indexes (e.g. join index B 422 in FIG. 4), which can act like database views in computing environments such as the Fast Search Infrastructure (FSI) available from SAP SE of Walldorf, Germany.

As stated above, a calculation scenario 450 can include individual nodes (e.g. calculation nodes) 411-414, which in turn each define operations such as joining various physical or logical indexes and other calculation nodes (e.g., CView 4 is a join of CView 2 and CView 3). That is, the input for a node 411-414 an be one or more physical, join, or OLAP indexes or calculation nodes.

In a calculation scenario 450, two different representations can be provided, including a) a pure calculation scenario in which all possible attributes are given and b) an instantiated model that contains only the attributes requested in the query (and required for further calculations). Thus, calculation scenarios can be created that can be used for various queries. With such an arrangement, a calculation scenario 450 can be created which can be reused by multiple queries even if such queries do not require every attribute specified by the calculation scenario 450.

Every calculation scenario 450 can be uniquely identifiable by a name (e.g., the calculation scenario 450 can be a database object with a unique identifier, etc.). Accordingly, the calculation scenario 450 can be queried in a manner similar to a view in a SQL database. Thus, the query is forwarded to the calculation node 411-414 for the calculation scenario 450 that is marked as the corresponding default node. In addition, a query can be executed on a particular calculation node 411-414 (as specified in the query). Furthermore, nested calculation scenarios can be generated in which one calculation scenario 450 is used as source in another calculation scenario (e.g. via a calculation node 411-414 in this calculation scenario 450). Each calculation node 411-414 can have one or more output tables. One output table can be consumed by several calculation nodes 411-414.

In some example embodiments, the case join may be included in a calculation scenario and handled by calculation engine 520. The calculation engine 520 may execute the case join and/or optimize the case join. Alternatively or additionally, the case join may be handled directly at the database server 440. For example, the case join may be executed directly at the database server layer 440. This may include optimization of the case join (for example, by database optimizer), if the case join satisfies the conditions for optimization.

Figure 5:
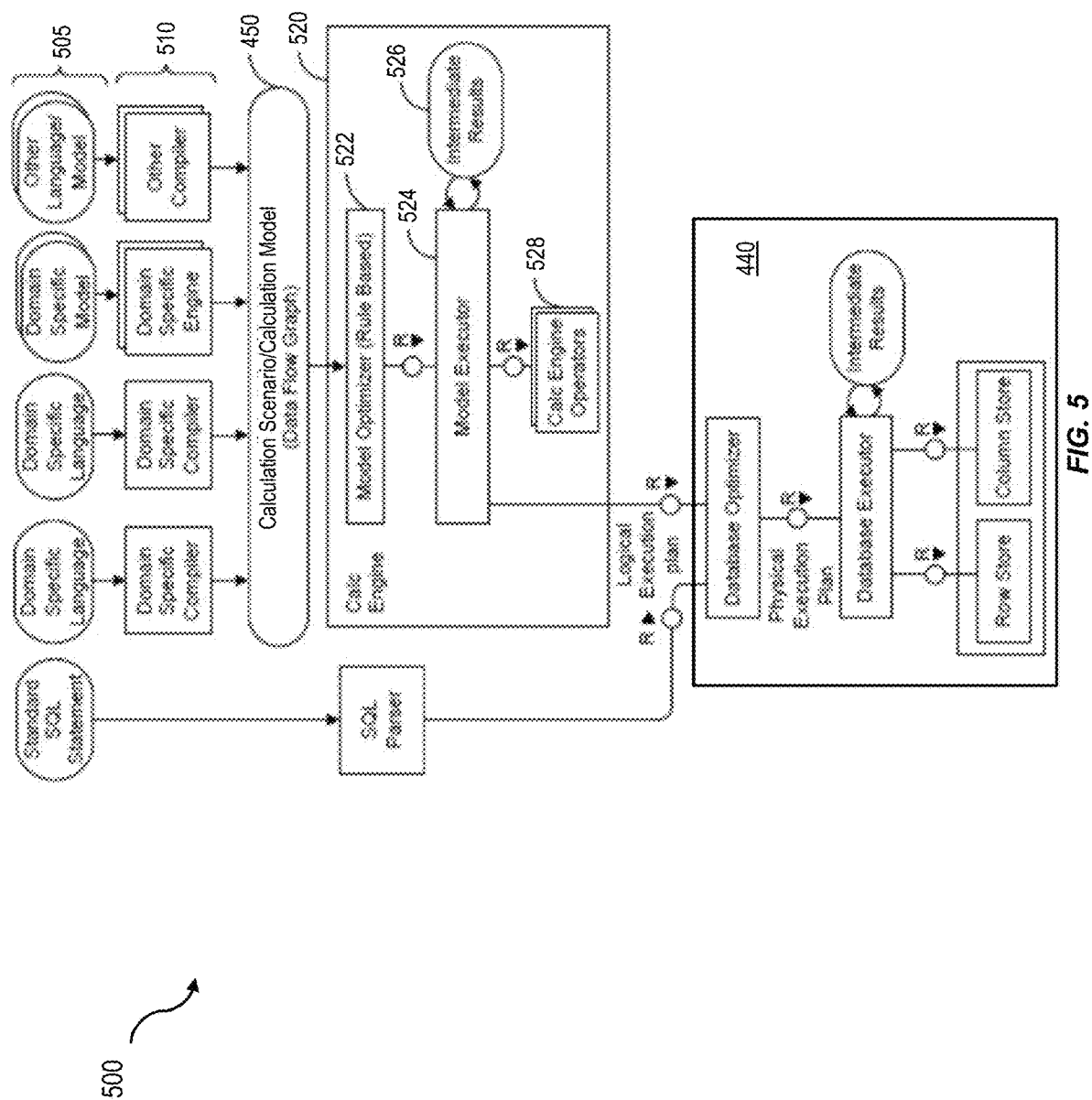
FIG. 5 depicts another example of a database system.

FIG. 5 is a diagram 500 illustrating a sample architecture for request processing and execution control. As shown in FIG. 5, artifacts 505 in different domain specific languages can be translated by their specific compilers 510 into a common representation called a "calculation scenario" 450 (which is also referred to in FIG. 5 as a calculation model). To achieve enhanced performance, the models and programs written in these languages are executed inside the database server 440. This arrangement eliminates the need to transfer large amounts of data between the database server 440 and a client application 437, which can be executed by an application server 435. Once the different artifacts 505 are compiled into this calculation scenario 515, they can be processed and executed in the same manner. A calculation engine 520 executes the calculation scenarios 515.

A calculation scenario 515 can be a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table valued parameters (i.e., user-defined table types that are passed into a procedure or function and that provide an efficient way to pass multiple rows of data to a client application 437 at the application server 435). Inputs can be connected to tables or to the outputs of other nodes. A calculation scenario 515 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 515 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, he or she can use a split. Then, the nodes can be automatically multiplied between split and merge and partition the data.

In some example embodiments, the calculation nodes may include one or more of the elements shown at FIGS. 2 and 3. For example, the calculation scenario may include the predefined view, UNION all, left outer join, and/or the like. Moreover, these calculation nodes may A calculation scenario 515 can be defined as part of database metadata and invoked multiple times. A calculation scenario 515 can be created, for example, by a SQL statement "CREATE CALCULATION SCENARIO <NAME> USING <XML or JSON>". Once a calculation scenario 515 is created, it can be queried (e.g., "SELECT A, B, C FROM <scenario name>", etc.). In some cases, databases can have predefined calculation scenarios 515 (default, previously defined by users, etc.). Calculation scenarios 515 can be persisted in a repository (coupled to the database server 440) or in transient scenarios. Calculation scenarios 515 can also be kept in-memory.

Calculation scenarios 515 are more powerful than traditional SQL queries or SQL views for many reasons. One reason is the possibility to define parameterized calculation schemas that are specialized when the actual query is issued. Unlike a SQL view, a calculation scenario 515 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 515 may contain an aggregation node containing all attributes. Later, the attributes for grouping can be supplied with the query. This allows having a predefined generic aggregation, with the actual aggregation dimensions supplied at invocation time. The calculation engine 520 can use the actual parameters, attribute list, grouping attributes, and the like supplied with the invocation to instantiate a query specific calculation scenario 515. This instantiated calculation scenario 515 is optimized for the actual query and does not contain attributes, nodes or data flows that are not needed for the specific invocation.

When the calculation engine 520 gets a request to execute a calculation scenario 515, it can first optimize the calculation scenario 515 using a rule based model optimizer 522. Examples for optimizations performed by the model optimizer can include "pushing down" filters and projections so that intermediate results 526 are narrowed down earlier, or the combination of multiple aggregation and join operations into one node. The optimized model can then be executed by a calculation engine model executor 524 (a similar or the same model executor can be used by the database directly in some cases). This includes decisions about parallel execution of operations in the calculation scenario 515. The model executor 524 can invoke the required operators (using, for example, a calculation engine operators module 528) and manage intermediate results. Most of the operators are executed directly in the calculation engine 520 (e.g., creating the union of several intermediate results). The remaining nodes of the calculation scenario 515 (not implemented in the calculation engine 520) can be transformed by the model executor 524 into a set of logical database execution plans. Multiple set operation nodes can be combined into one logical database execution plan if possible.

The calculation scenarios 515 of the calculation engine 520 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 520 to execute the calculation scenario 515 behind the calculation view. In some implementations, the calculation engine 520 and the SQL processor are calling each other: on one hand the calculation engine 520 invokes the SQL processor for executing set operations and SQL nodes and, on the other hand, the SQL processor invokes the calculation engine 520 when executing SQL queries with calculation views.

The attributes of the incoming datasets utilized by the rules of model optimizer 522 can additionally or alternatively be based on an estimated and/or actual amount of memory consumed by the dataset, a number of rows and/or columns in the dataset, and the number of cell values for the dataset, and the like.

A calculation scenario 515 as described herein can include a type of node referred to herein as a semantic node (or sometimes semantic root node). A database modeler can flag the root node (output) in a graphical calculation view to which the queries of the database applications directed as semantic node. This arrangement allows the calculation engine 520 to easily identify those queries and to thereby provide a proper handling of the query in all cases.

Without in any way limiting the scope, interpretation, or application of the claims appearing herein, a technical effect of one or more of the example embodiments disclosed herein may include increasing throughput of threads, maintaining power consumption (and as a result cooling demand) of a CPU below a certain threshold (which is according to the sizing of the power unit and cooling capacity of the computer system). Without in any way limiting the scope, interpretation, or application of the claims appearing herein, a technical effect of one or more of the example embodiments disclosed herein may include reducing the runtime of a series of tasks independently of the design of the task through the increased efficiency of accessing the priority queue of a task scheduler, by reducing lock contention on the priority queue, while decreasing the looseness that can be introduced by lock contention reducing algorithm These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein does not require the particular order shown, or sequential order, to achieve desirable results. In addition, other processing attributes other than threads can be used to determine whether to selectively change the speed of a core scheduled to process the corresponding tasks. Moreover, the term task can be construed, unless explicitly stated otherwise, to include jobs and other broader groupings of related computing activities. Other embodiments may be within the scope of the following claims.

What is claimed:

1. A method comprising:
    receiving, at a processor, a database query for a predefined view, the predefined view configured to query on a predefined set of data tables at a database, the predefined view configured to inhibit modification of the predefined view by an end-user at a user interface providing the received database query;
    detecting, at the processor and in response to the database query, that the predefined view requires a database table extended in the database to include an additional column not defined by the predefined view, wherein the predefined view is defined to inhibit taking into account the additional column;
    in response to the detecting, generating, at the processor and based on a case join, a view, the case join including a branch condition, as a condition predicate, for performing a join of the database table, without the additional column inhibited by the predefined view, and another database table including the additional column, the branch condition indicating the database table has been modified to include an additional column; and
    providing, by the processor, the generated view for display.

2. The method of claim 1, wherein the predefined view comprises a result set generated by one or more predefined subqueries on the predefined set of data tables at the database.

3. The method of claim 1, wherein the database query is received at the processor comprising a query optimizer.

4. The method of claim 3, wherein the query optimizer performs the case join to provide the predefined view including the additional column.

5. The method of claim 1, wherein the join comprises a right outer join or a left inner join.

6. The method of claim 3, further comprising:
    in response to the detecting, decomposing, by the query optimizer, the case join when the case join comprises a self key join in which tables are being joined with themselves.

7. The method of claim 6, wherein the query optimizer decomposes the case join by at least adding, at the view, the added column, without performing a join.

8. A system comprising:
    at least one processor and at least one memory including code which when executed causes operations comprising:
    receiving, at a processor, a database query for a predefined view, the predefined view configured to query on a predefined set of data tables at a database, the predefined view configured to inhibit modification of the predefined view by an end-user at a user interface providing the received database query;
    detecting, at the processor and in response to the database query, that the predefined view requires a database table extended in the database to include an additional column not defined by the predefined view, wherein the predefined view is defined to inhibit taking into account the additional column;
    in response to the detecting, generating, at the processor and based on a case join, a view, the case join including a branch condition, as a condition predicate, for performing a join of the database table, without the additional column inhibited by the predefined view, and another database table including the additional column, the branch condition indicating the database table has been modified to include an additional column; and
    providing, by the processor, the generated view for display.

9. The system of claim 8, wherein the predefined view comprises a result set generated by one or more predefined subqueries on the predefined set of data tables at the database.

10. The system of claim 8, wherein the database query is received at a query optimizer.

11. The system of claim 10, wherein the query optimizer performs the case join to provide the predefined view including the additional column.

12. The system of claim 8, wherein the join comprises a right outer join or a left inner join.

13. The system of claim 10, further comprising:
    in response to the detecting, decomposing, by the query optimizer, the case join when the case join comprises a self key join in which tables are being joined with themselves.

14. The system of claim 13, wherein the query optimizer decomposes the case join by at least adding, at the view, the added column, without performing a join.

15. A non-transitory computer-readable storage medium including program code which when executed causes operations comprising:
    at least one processor and at least one memory including code which when executed causes operations comprising:
    receiving, at a processor, a database query for a predefined view, the predefined view configured to query on a predefined set of data tables at a database, the predefined view configured to inhibit modification of the predefined view by an end-user at a user interface providing the received database query;

detecting, at the processor and in response to the database query, that the predefined view requires a database table extended in the database to include an additional column not defined by the predefined view, wherein the predefined view is defined to inhibit taking into account the additional column;

in response to the detecting, generating, at the processor and based on a case join, a view, the case join including a branch condition, as a condition predicate, for performing a join of the database table, without the additional column inhibited by the predefined view, and another database table including the additional column, the branch condition indicating the database table has been modified to include an additional column; and providing, by the processor, the generated view for display.

16. The non-transitory computer-readable storage medium of claim 15, wherein the predefined view comprises a result set generated by one or more predefined subqueries on the predefined set of data tables at the database.

17. The non-transitory computer-readable storage medium of claim 15, wherein the database query is received at a query optimizer.

18. The non-transitory computer-readable storage medium of claim 15, wherein the inhibition prevents adding the additional column directly to the database table.

19. The method of claim 1, wherein the predefined view requires another database table extended in the database to include an another column not defined by the predefined view, and wherein the case join includes another branch condition indicating the other database table has been modified to include an another column.

* * * * *